United States Patent
Carroll et al.

(10) Patent No.: US 10,805,184 B2
(45) Date of Patent: Oct. 13, 2020

(54) DATA ANALYTICS AND MANAGEMENT OF COMPUTING INFRASTRUCTURES

(71) Applicant: Amazon Technologies, Inc., Seattle, WA (US)

(72) Inventors: Theodore A. Carroll, Seattle, WA (US); Bruce Twito, Lake Forest Park, WA (US); John Scumniotales, Bainbridge Island, WA (US); Christopher Baker, Clyde Hill, WA (US)

(73) Assignee: Amazon Technologies, Inc., Seattle, WA (US)

( * ) Notice: Subject to any disclaimer, the term of this patent is extended or adjusted under 35 U.S.C. 154(b) by 299 days.

(21) Appl. No.: 15/222,881

(22) Filed: Jul. 28, 2016

(65) Prior Publication Data

US 2017/0034016 A1     Feb. 2, 2017

Related U.S. Application Data

(60) Provisional application No. 62/198,052, filed on Jul. 28, 2015.

(51) Int. Cl.
*H04L 12/26* (2006.01)
*H04L 12/24* (2006.01)

(52) U.S. Cl.
CPC ........ *H04L 43/026* (2013.01); *H04L 41/0813* (2013.01); *H04L 41/0853* (2013.01); *H04L 41/142* (2013.01); *H04L 43/04* (2013.01)

(58) Field of Classification Search
CPC .................. H04L 43/022; H04L 41/0876
See application file for complete search history.

(56) References Cited

U.S. PATENT DOCUMENTS

| | | | | |
|---|---|---|---|---|
| 8,959,633 B1* | 2/2015 | Dokey | ................... | G06F 21/50 705/30 |
| 2011/0055377 A1* | 3/2011 | Dehaan | ................. | G06F 9/4856 709/224 |
| 2012/0096134 A1* | 4/2012 | Suit | ....................... | G06F 9/5072 709/221 |
| 2012/0304179 A1* | 11/2012 | Devarakonda | ......... | G06Q 10/00 718/102 |
| 2013/0185413 A1* | 7/2013 | Beaty | ................... | G06F 9/5072 709/224 |
| 2013/0262390 A1* | 10/2013 | Kumarasamy | ...... | H04L 41/0846 707/649 |

(Continued)

*Primary Examiner* — Nicholas R Taylor
*Assistant Examiner* — Sanjoy Roy
(74) *Attorney, Agent, or Firm* — Robert C. Kowert; Kowert, Hood, Munyon, Rankin & Goetzel, P.C.

(57) ABSTRACT

Methods, systems, and techniques for analyzing and managing time series workload data are provided. Example embodiments provide a Data Management and Analysis platform that enables end users to modernize their system configurations to incorporate external services techniques, such as cloud technologies, and to utilize virtualization technologies to host some of their functions in a manner that improves the overall performance of their configurations. This may be particularly useful in an IT environment with many interdependent systems where it is hard to analyze and determine where externally hosted or hybrid (e.g., both remote and local) systems might improve the overall delivery of services and cost to end users.

20 Claims, 14 Drawing Sheets

(56) References Cited

U.S. PATENT DOCUMENTS

| | | | |
|---|---|---|---|
| 2013/0290238 A1* | 10/2013 | Griffith | G06N 5/025 |
| | | | 706/47 |
| 2014/0089495 A1* | 3/2014 | Akolkar | H04L 41/147 |
| | | | 709/224 |
| 2014/0177494 A1* | 6/2014 | Min | H04W 52/0209 |
| | | | 370/311 |
| 2014/0280338 A1* | 9/2014 | Metz | H04L 41/0853 |
| | | | 707/774 |
| 2014/0282456 A1* | 9/2014 | Drost | G06F 8/76 |
| | | | 717/158 |
| 2015/0082432 A1* | 3/2015 | Eaton | H04L 47/785 |
| | | | 726/23 |
| 2016/0087859 A1* | 3/2016 | Kuan | H04L 43/0817 |
| | | | 715/736 |
| 2016/0094477 A1* | 3/2016 | Bai | H04L 47/786 |
| | | | 709/226 |

* cited by examiner

DATA ANALYTICS AND MANAGEMENT OF COMPUTING INFRASTRUCTURES

CROSS-REFERENCE TO RELATED APPLICATIONS

This application claims the benefit of U.S. Provisional Patent Application No. 62/198,052, entitled "DATA ANALYTICS AND MANAGEMENT," filed Jul. 28, 2015, which is incorporated herein by reference in its entirety.

TECHNICAL FIELD

The present disclosure relates to methods, techniques, and systems for analyzing and managing data and, in particular, to methods, techniques, and systems for sensing, analyzing, and managing time series workload data.

BACKGROUND

Computing system environments have become incredibly complicated as many involve a variety of types of hardware, software, nodes, use of external systems, and the like. It has become hard to decipher when it is appropriate to take advantage of modernization techniques such as virtualization and cloud offloading and for what systems given the interdependency of various computational nodes and the difficulty of collecting, correlating, and analyzing the myriad of data required to understand dynamic system behaviors and resource use.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
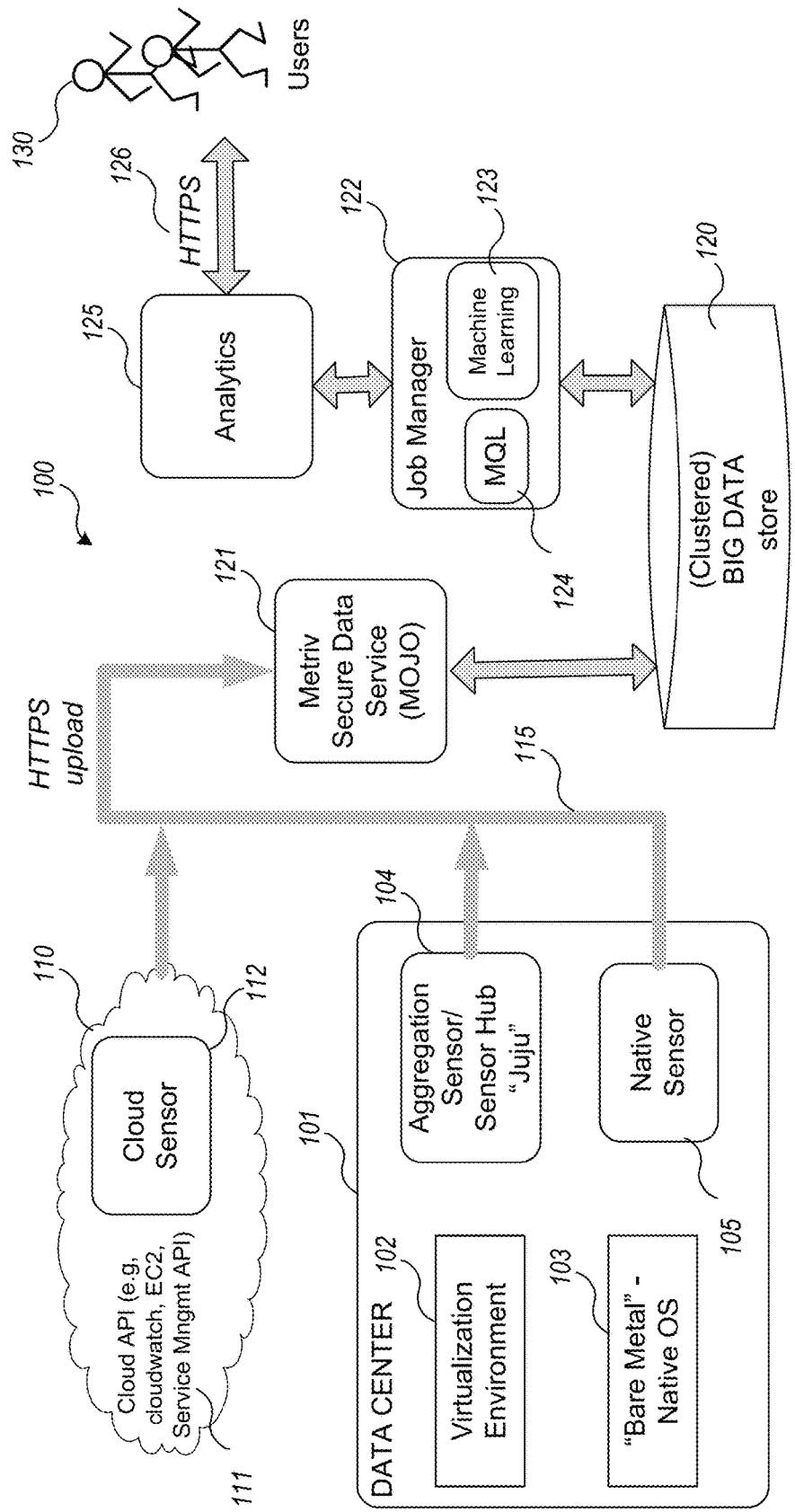
FIG. 1A is an overview block diagram of a Data Management and Analytics Platform.

Embodiments described herein provide enhanced computer- and network-based methods, techniques, and systems for analyzing and managing time series workload data to enable users to understand and modernize their system configurations to incorporate external services techniques, such as cloud technologies, and to utilize virtualization technologies to host some of their functions in a manner that reduces costs, increases reliability, updates technology, and improves the overall performance of their configurations. This may be particularly useful in an IT environment with many interdependent systems where it is hard to analyze and determine where externally hosted or hybrid (e.g., both remote and local) systems might improve the overall delivery of services and cost to end users.

Example embodiments provide a Data Management and Analytics Platform ("DMAP") 100 as shown in FIG. 1, which enables users such as system administrators to determine which parts of the configuration are better migrated to external services (such as cloud based and virtualized technologies) and which are better to remain as locally served. The DMAP 100 itself contains a set of cloud based services that continuously store, collect, and process data from a set of sensors (hardware, software, or both) and make the data available for search using a proprietary search engine and query language and utilize a machine learning complemented analysis to understand the obtained sensor data. For example, Metriv Secure Data Service 121 and Big Data Store 120 store, collect, and process data from aggregation, native, and cloud sensors 104, 105, and 112, respectively. Analytics engine 125, using job manager 122 to implement MQL queries 124 and machine learning tool 123, analyzes the obtained data. Once the data from the sensors is analyzed, the DMAP can recommend cloud and virtualization modernization strategies that provide more efficient (and less costly) storage and performance by utilizing cloud and virtualized technologies such Amazon AWS and VMware; Azure, OpenStack, vCloud Air, Docker, Citrix XenApp, Microsoft Hyper-V. The machine learning analysis tools 123 of the DMAP provide advanced predictive analytics, modernization costing and planning, so that better decisions with respect to use of public/private clouds and virtualization can be incorporated into an overall system configuration (such as an IT infrastructure of a corporation).

Also, although certain terms are used primarily herein, other terms could be used interchangeably to yield equivalent embodiments and examples. In addition, terms may have alternate spellings which may or may not be explicitly mentioned, and all such variations of terms are intended to be included.

Metriv—an Example Data Management and Analytics Platform

Overview

Metriv is an advanced data management and analytics platform that allows its users to visualize their IT infrastructure and create data-based plans to modernize and optimize IT based on critical time-series system, service, and application workload.

Metriv includes a set of cloud-based services that collect and process data collected by Metriv Sensors and makes the data available for search and charting on the Metriv Analytics website and to third-party business intelligence (BI) and IT operations management tools such as Tableau, Splunk, IBM Tivoli, Microsoft System Center and more. Data rendering, chart rendering and search are accomplished with the domain-specific Metriv Query Language (MQL).

Figure 1B:
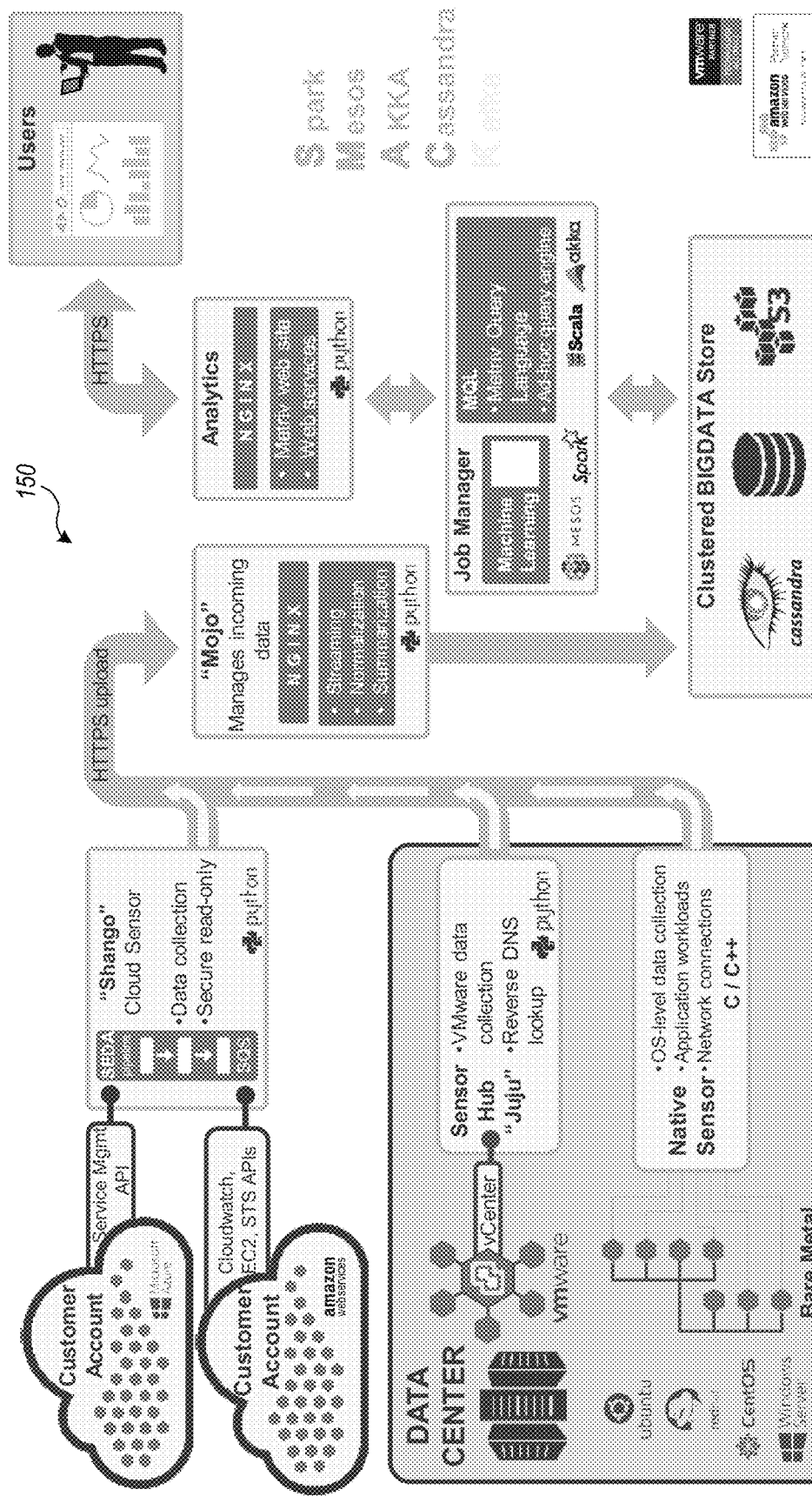
FIG. 1B is an overview block diagram of an example embodiment of a Data Management and Analytics Platform.

FIG. 1B shows the Metriv high-level architecture.

Data Analytics and Management Platform 150 comprises a variety of web-based components for managing data retrieved from various components of an IT infrastructure. Metriv sensors communicate with a publicly accessible web service called Metriv Secure Data Services (e.g., Mojo) that handles policy, inventory, data collection and data rollup. When data is available from cloud-accessible APIs (e.g. AWS, Azure, DNS), Metriv uses its own cloud-based sensor. When API data is behind enterprise firewalls, such as VMware discovery and internal DNS, the Metriv Sensor Hub, installed behind the firewall, collects and multiplexes data then forwards the data to Metriv. For data accessible only when running locally in the native operating system (e.g. process details, network communications, performance data, installed packages), the Metriv Native Sensor is installed on either Windows or Linux platforms then sends its compressed summary data to Metriv Secure Data Services. In the example described these are software sensors although in other embodiments, the sensors could be hardware or some mix of hardware, firmware, or software.

The primary user interface to the system is an analytics web site which handles user login, charting, dashboards, scenarios, alerting, and query building. The analytics web site generates queries to render reports, graphs, and dashboards. These queries, expressed in the MQL (Metriv Query Language), are submitted to a distributed query engine for parallel execution. MQL is a rich, user-accessible query and statistics language patterned after the Unix pipe model (which filters data through a series of pipes—or programs) with rich built-in charting capabilities.

Appendix A, incorporated herein by reference in its entirety, includes a set of screen displays for an example Metriv Data Management and Analytics Platform.

Appendix B, incorporated herein by reference in its entirety, is a User Guide for the MQL (Metriv Query Language) also referred to as Mojo. MQL is used for specifying queries to generate charts and reports to provide user accessible analytics.

Appendix C, incorporated herein by reference in its entirety, is a presentation directed to showing the benefits of using the Metriv Data Management and Analytics Platform.

Metriv Sensors

For Metriv to provide insights into configuration, workloads, and system inter-dependencies, the system needs data from multiple sources. Metriv uses various types of sensors that collect and transform data then deliver the data to the Metriv Secure Data (web) Service, where it is further transformed, summarized, and stored for access by Metriv Analytics and other business intelligence (BI) and analytic solutions.

Two closely related concepts embodied in the system are that of a sensor and node. A sensor collects data about one or more nodes. A single node may have multiple sensors collecting data for it. For example, a single node may have a native sensor collecting detailed time series and inventory data and a VMware sensor that is collecting VMware-specific data. Metriv integrates both sets of data into a single node-oriented view.

Sensors collect information about one or more nodes and send data to the Mojo service. The three major sensor types are:

Native Sensor—Native sensors gather information that can only be retrieved by running natively within the OS.

Sensor Hub "Juju"—A multiplexed (aggregating) pluggable service that runs behind the corporate firewall to discover and collect information about the local environment (such as a virtualization environment).

Cloud Sensor "Shango"—A Metriv-hosted sensor that collects information from cloud-available APIs.

Metriv Sensors are designed to be ported to new platforms with minimal changes.

Sensor installers are built by Metriv specifically for each account. The sensor deployment package contains credentials to be authorized to a specific Metriv account. No post-installation configuration is required for the sensor to register so both installation and installation automation are trivial.

Native Sensor for Windows and Unix

The native sensor runs locally on the native operating system (OS) of virtual machines (VMs), cloud instances, or non-virtualized hardware. The native sensor is a compact, efficient service (daemon) that collects a multitude of information and can be extended to collect more, often just with a simple policy change. The native sensor may collect:

OS and hardware configuration and settings
System-level performance counters
Running processes and related performance counters
Network connections
File contents On Windows the native sensor may also collect:
Installed applications
User activity, including active applications and web URLs accessed Data collection is driven by policy. Only policy-requested information is collected and monitored. Policies are extensible—a collection of new attributes (such as registry entry on Windows) or performance counters can generally be done with a simple policy change. Performance counter and network connection statistics are aggregated by the sensor, effectively reducing data volume yet still allowing some number of minutes (e.g., 15 minute) level detail with min, max, and mean values sampled at regular (for example 15 second) intervals.

A local data store (e.g., SQLite) is used to save some types of data between uploads to the Metriv Secure Data Services web service (e.g., Mojo), so critical data is reliably collected even when no Internet connection is available.

Figure 2:
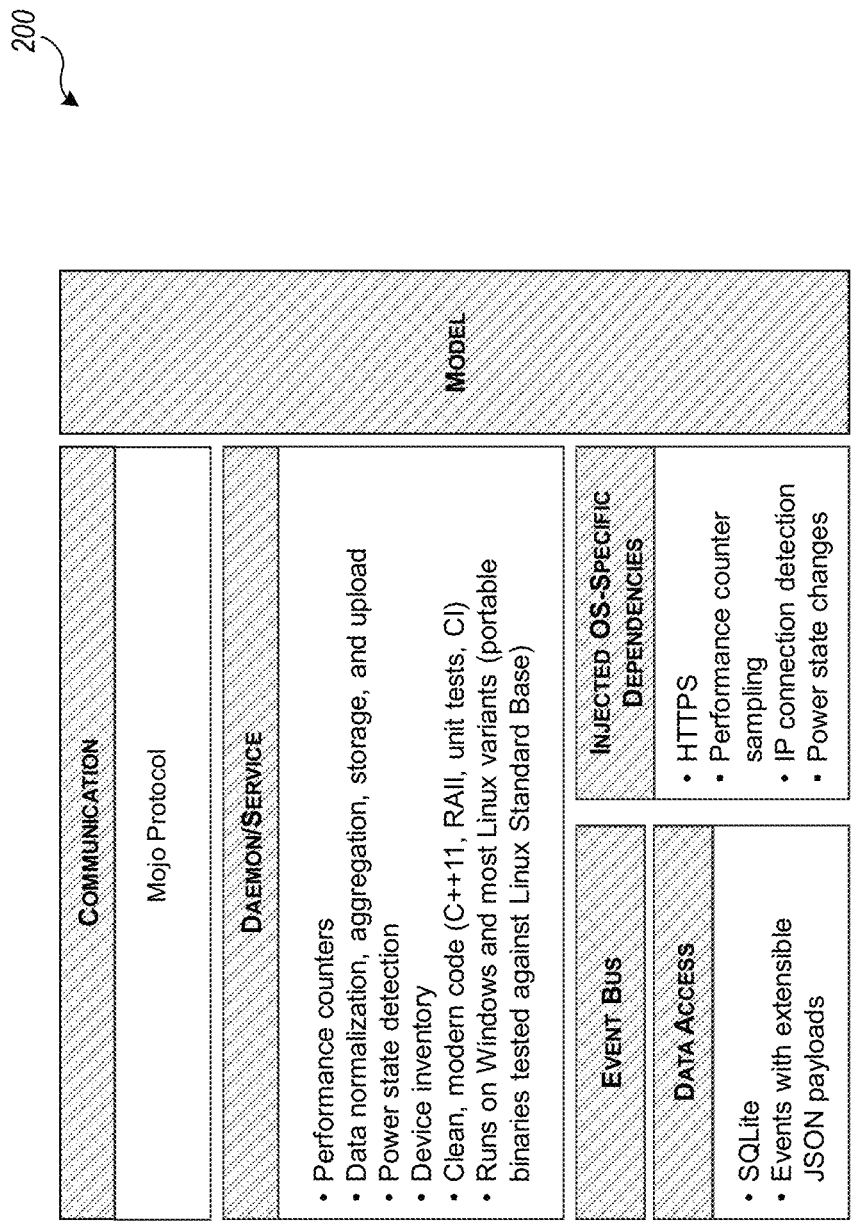
FIG. 2 is a block diagram of an example embodiment of a native sensor architecture in an example Data Management and Analytics Platform.

FIG. 2 depicts the Native Sensor internal architecture.

Metriv Sensor Hub "Juju" (Aggregating or Multiplexing Sensor)

Juju is written in portable Python, and is currently delivered as a Windows service. The two plugins currently included with Juju collect VMware data and perform reverse DNS lookup of systems behind the corporate firewall.

VMware Plugin

Juju is configured with credentials it uses to discover and collect information about VMware hosts and guests. It tracks VMware performance counters for each VM host and guest, along with topology information about the VMware deployment.

For VMs monitored by both the VMware sensor and native sensors, Metriv reports on them as a single host and shows both the VMware and guest OS statistics combined.

Of course with native sensors, much more workload, process, and configuration information is available compared to a VMware-only sensor.

Reverse DNS Plugin

Juju receives lists of IP addresses and performs reverse DNS lookups to find hostnames from private IP address ranges that cannot otherwise be resolved. This way Metriv can show system names for computers behind a firewall.

Future Juju Plugins

The Juju sensor is built on a library that is designed and envisioned to be extended to collect data from catalogs, databases, log files, JMX metrics and other sources.

Metriv envisions plugins to discover nodes and topology by using Active Directory APIs, DNS zone lists, network topology discovery components, operations systems such as Microsoft System Center, and other behind-the-firewall data sources.

Figure 3:
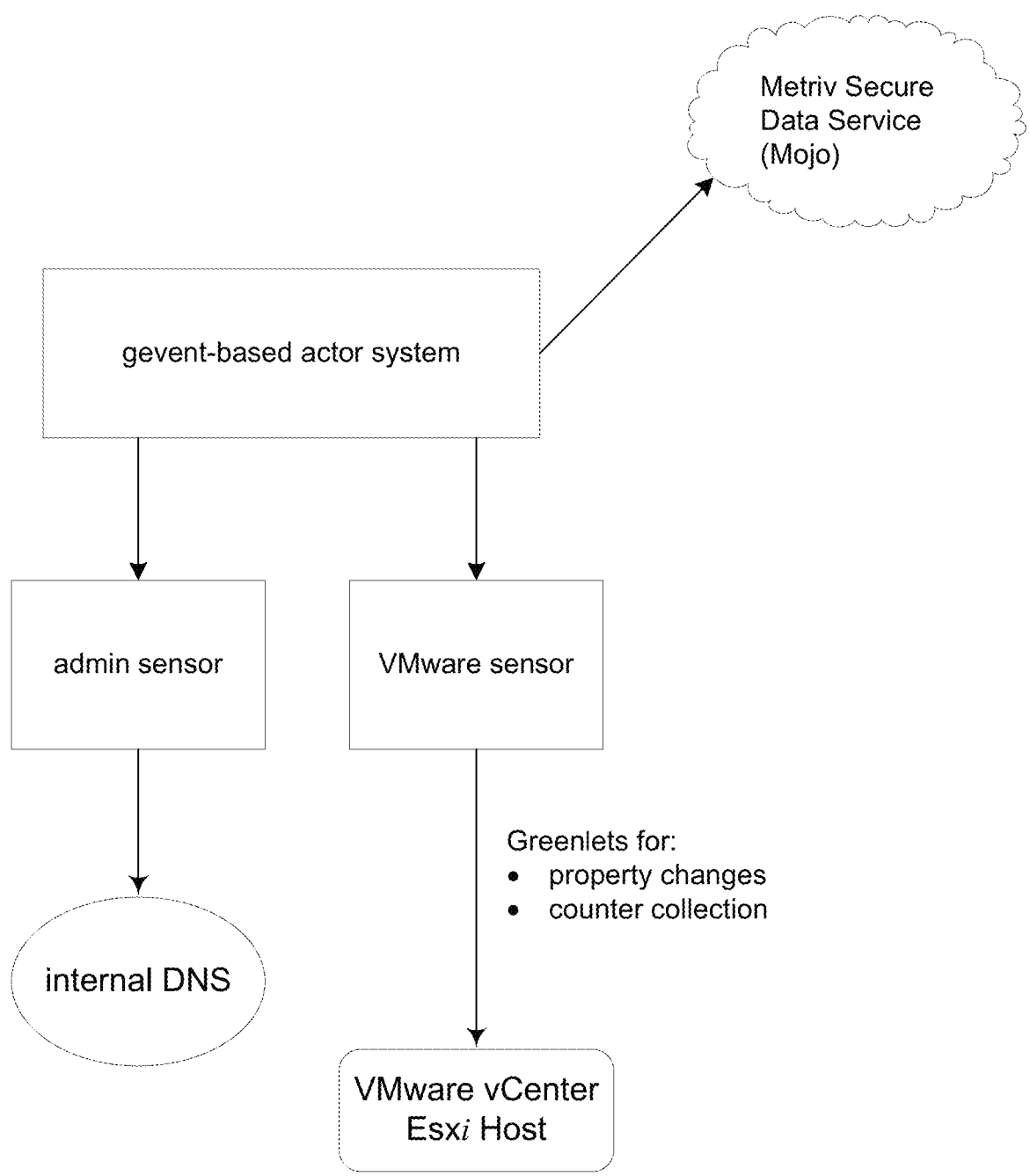
FIG. 3 is a block diagram of an example embodiment of a multiplexing sensor architecture in an example Data Management and Analytics Platform.

FIG. 3 depicts an example architecture for a multiplexing sensor.

Metriv Cloud Sensor "Shango"

The Metriv cloud sensor is granted rights to use APIs of cloud providers such as Amazon Web Services, Microsoft Azure, Google Cloud, and other cloud providers. Similar to the VMware sensor, the Metriv Cloud Sensor discovers nodes and collects performance counters, then makes them available from Metriv Analytics and MQL.

Shango uses a Staged Event Driven Architecture (SEDA), where successive phases of node discovery and metric collection are queued for workers. This allows scalable, fast discovery of nodes and node changes while allowing time-series data to be collected in independent steps.

The stages are currently:

Enqueue discovery for each configured Metriv user account

Discover and register instance then enqueue metric discovery

Discover available metrics and enqueue metric collection

Collect metrics

Each stage has its own queue and celery worker pool so stages can be scaled as needed.

Figure 4:
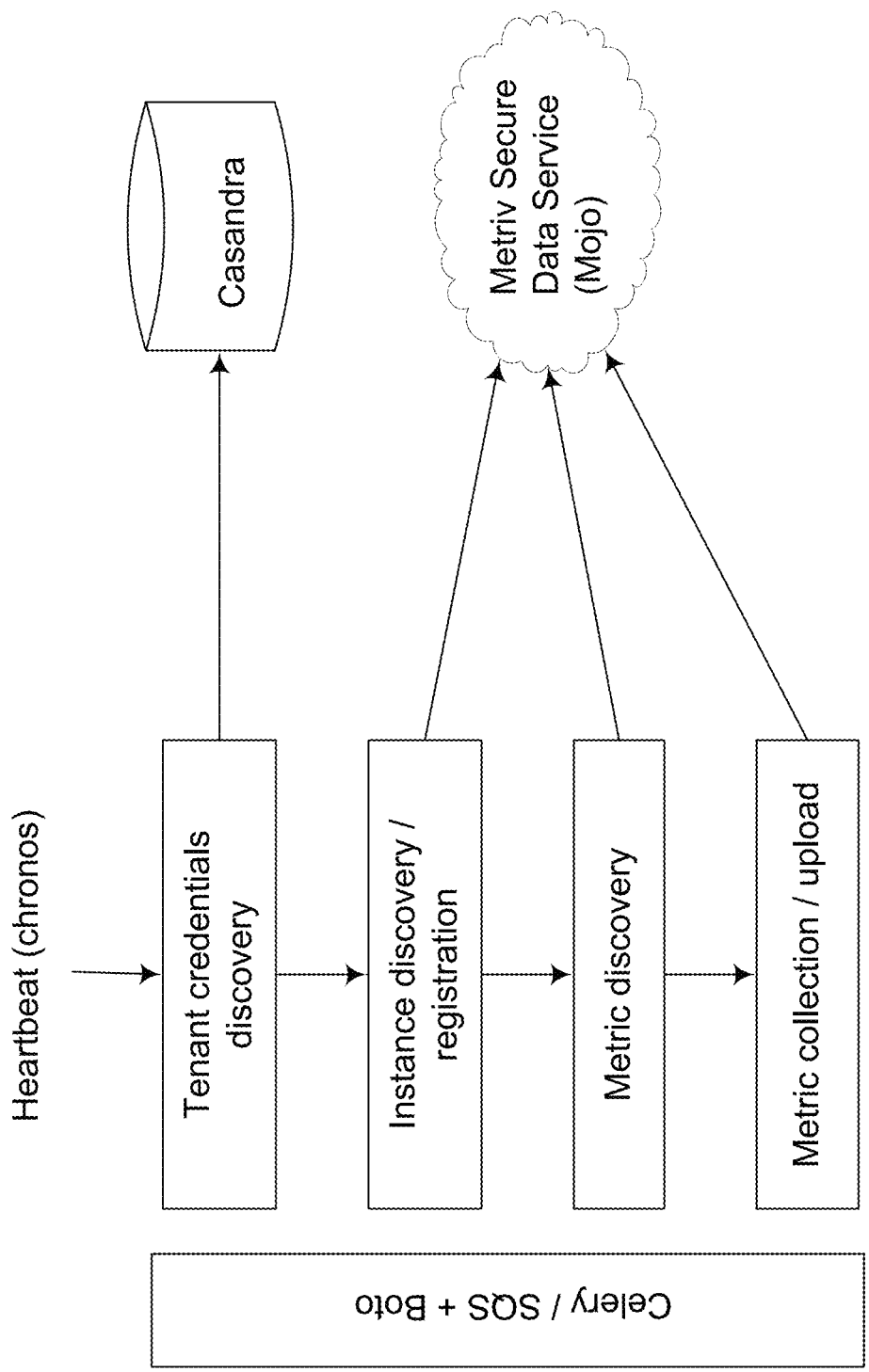
FIG. 4 is a block diagram of an example embodiment of a cloud sensor architecture in an example Data Management and Analytics Platform.

FIG. 4 is an example architecture of a cloud sensor.

Metriv Secure Data Service (e.g., Mojo Service)

Mojo is a web service that receives and processes information from sensors. Mojo offers the following services:

Authorization and registration: Mojo verifies the sensor has correct credentials.

Node registration/re-registration: Mojo recognizes if a node has already registered—even if the node has been re-imaged. During node registration, Mojo also recognizes if the node has already been discovered by another sensor to map multiple sensors to a single node.

Node migration tracking: Mojo recognizes nodes with the native sensor as they move among VM hosts or are migrated to cloud services via lift-and-shift imaging techniques.

Policy provider: Mojo provides data collection policies for the sensor to follow.

Event and performance counter storage: Mojo asks sensor for all data that has not yet been stored.

Data rollup and on-the-fly analytics: Mojo performs on-the-fly analytics, immediately updating long-term statistics with new data.

Figure 5:
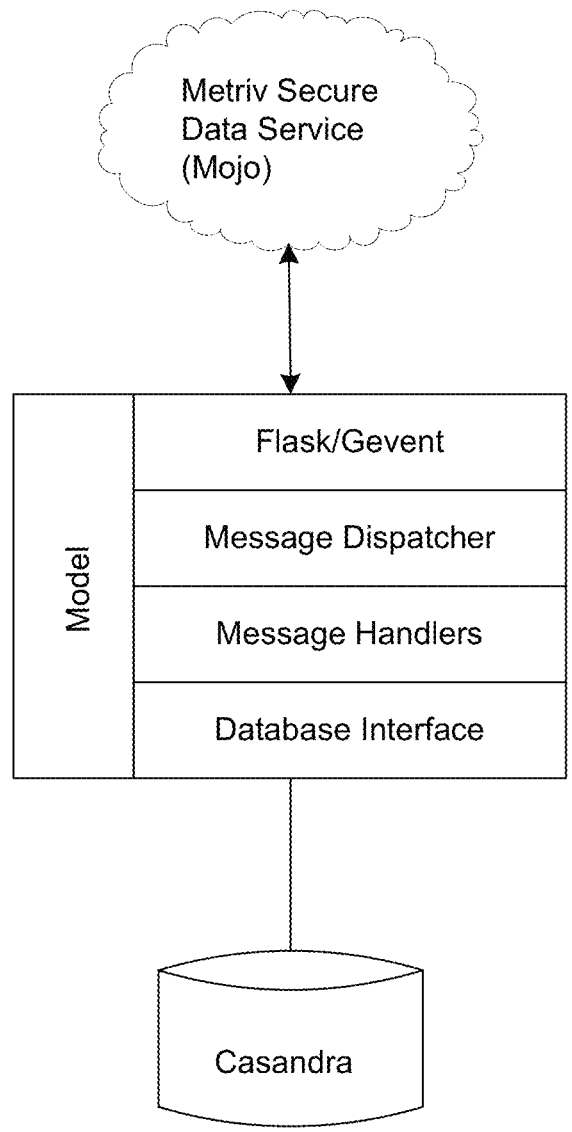
FIG. 5 is an block diagram of an example embodiment of a Secure Data Services (web service) architecture that processes information from sensors in an example Data Management and Analytics Platform.

In one implementation, as shown in FIG. 5, The Mojo web service is written in Python on top of the Flask web application framework and uses gevent to provide event-loop style execution of concurrent web requests. Mojo is run behind nginx with multiple Mojo processes on each instance. Here, a "model" component denotes a set of classes that use standard programming techniques to drive several key components of the system including a Cassandra database schema.

When a sensor recognizes a node, it calls Mojo to register the node. Mojo decides, based on the information in the initial request, which logical node the sensor is reporting on and informs the sensor of that node's identity.

Subsequent requests take the form of HTTP POSTS that contain messages from one or more sensors. These messages may ask for any pending messages (such as policy changes, immediate commands, or upgrade notifications) and report of time series or inventory data.

As is typical of most NoSQL databases, the storage of the data must be done with an eye to the query patterns that the application will use. In a typical NoSQL application, data is stored in a de-normalized form. Mojo does multiple writes to Cassandra to accomplish this along with a small amount of online rollup and summarization. Other data storage capabilities may also be incorporated in addition to or instead of Cassandra.

Metriv Analytics

The Metriv Analytics website is the primary user interface for the system. It allows users to login, invite other authorized uses to access data, administer sensors, and create reports, graphs and dashboards.

The website uses several common open-source technologies including Python, Flask, Bootstrap, require.js, Backbone, and JQuery. It also uses Highcharts and D3 for graphing.

Apart from account management, all data is stored in Cassandra. In most areas, the analytics site does not access Cassandra directly. One of the driving requirements for the Metriv system is that customers must be able to access their data in ways not anticipated, while still allowing Metriv to provide "guardrails" that keep users from writing queries that degrade performance of the service for other customers.

To this end, queries, charts, and reports are done through a query language called Metriv Query Language (MQL)—see section below for more details—that allows efficient access, parallelized executions, and control over resources consumed.

While MQL is at the heart of the analytics experience, it is often the case that users can get the answers they need without ever seeing MQL by using the interactive query building and dashboard building facilities of the analytics site.

Figure 6:
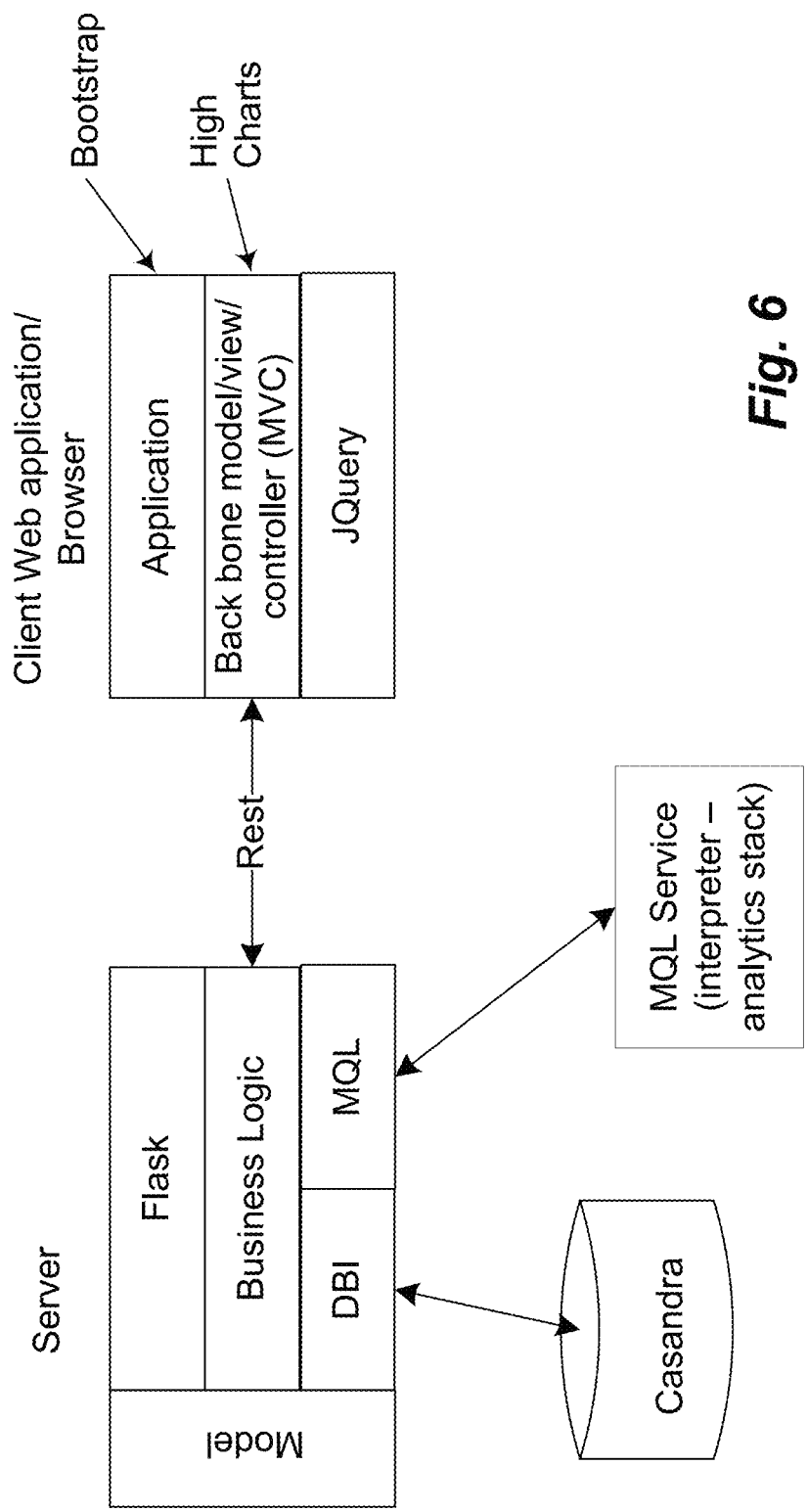
FIG. 6 is a block diagram of an example embodiment of an analytics website for accessing functionality of an example Data Management and Analytics Platform.

FIG. 6 illustrates a layer diagram of the analytics website.

Metriv Query Language (MQL) Query, Statistics, and Chart Rendering

The Metriv Query Language (MQL) is patterned after the Unix pipe concept, which has become a common paradigm for machine-data systems like AppSumo and Splunk. By selecting a paradigm familiar to system administrators, Metriv keeps the cognitive load down as administrator users switch from system to system.

The following example an MQL query renders the chart below of idle time for each hour of the day by node. The query results are displayed in FIG. 7. This highlights any daily cyclic usage patterns:

```
sample where
    device.virtualizationType=="Not Virtualized"
    and counter.categoryName=="Processor"
    and counter.counterName=="% Processor Time"
```

```
| eval hour = hourofday(_time), idle_peak = 100.0 - max
| chart avg (idle_peak) over month by device.deviceName
```

The chart gives a pretty good idea of physical servers which could probably be better used by virtualizing their current workloads.

Figure 7:
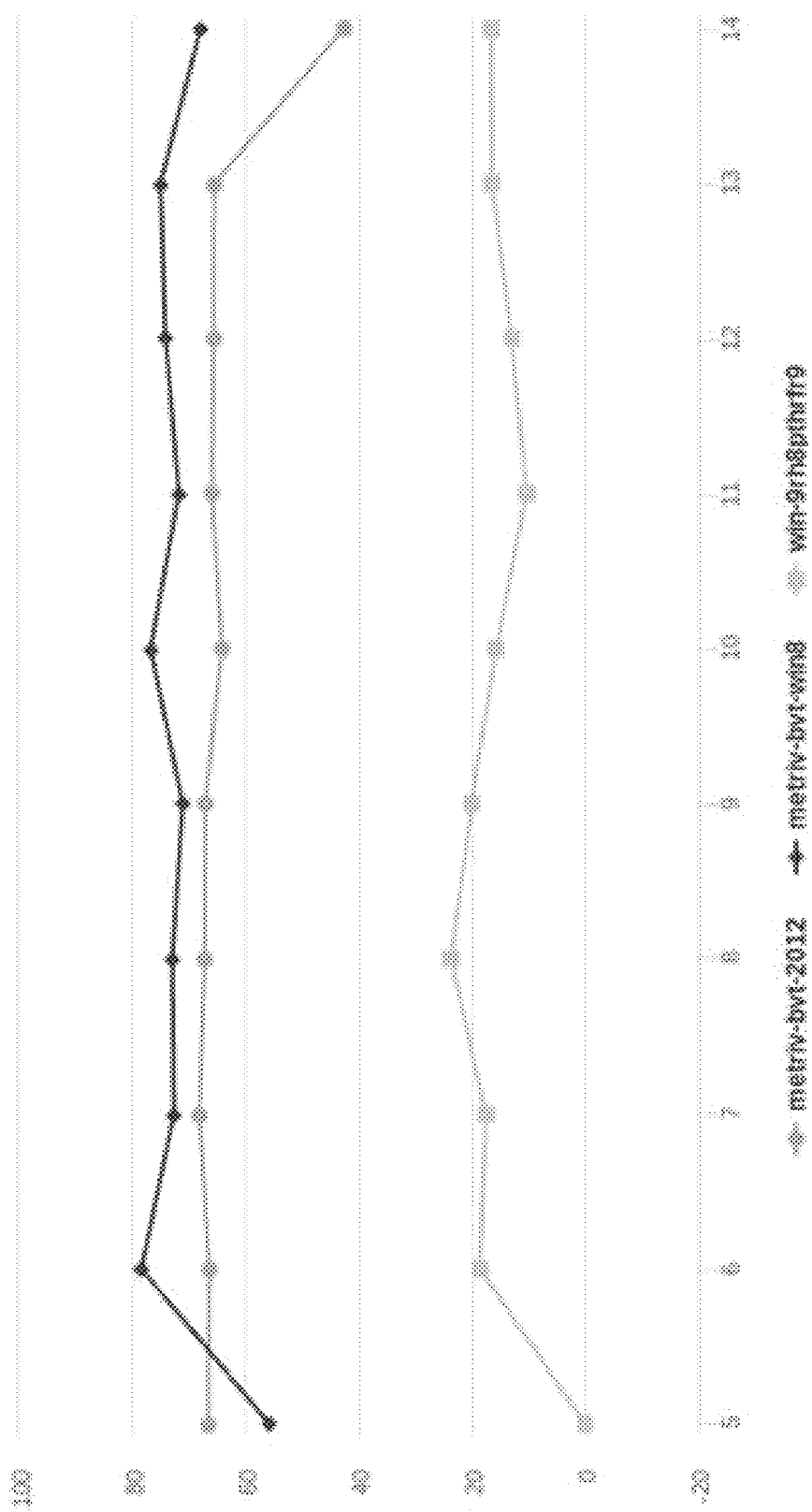
FIG. 7 is an example chart with data showing physical servers in a computing environment that could be virtualized

The chart shown in FIG. 7 shows two systems (metriv-bvt-2012 and metriv-bvt-win8) that, even at their peak workload, are idle 60-80% of the time throughout the entire last month. Since these systems are idle a significant portion of time, they would be good candidates for virtualization on hardware that could share resources between them and other systems. The third system, win-9rh8pthrfr9, is idle less than 20% of the time on average, so would not be as attractive of a candidate to share resources with other systems.

MQL Query Evaluation

The MQL Service, which is implemented in Scala, consists of a set of load-balanced job managers that take incoming queries, parse them, prepare execution plans, coordinate distributed execution, and, optionally, perform any final transformation on the results, which are then returned in JSON format.

The MQL Service creates data-flow operator graphs to process queries, much like most modern query processing systems. One major difference between the MQL Service and a traditional database server is that the MQL Service translates large portions of an operator graph into distributed operations using Apache Spark as an underlying execution engine.

Figure 8:
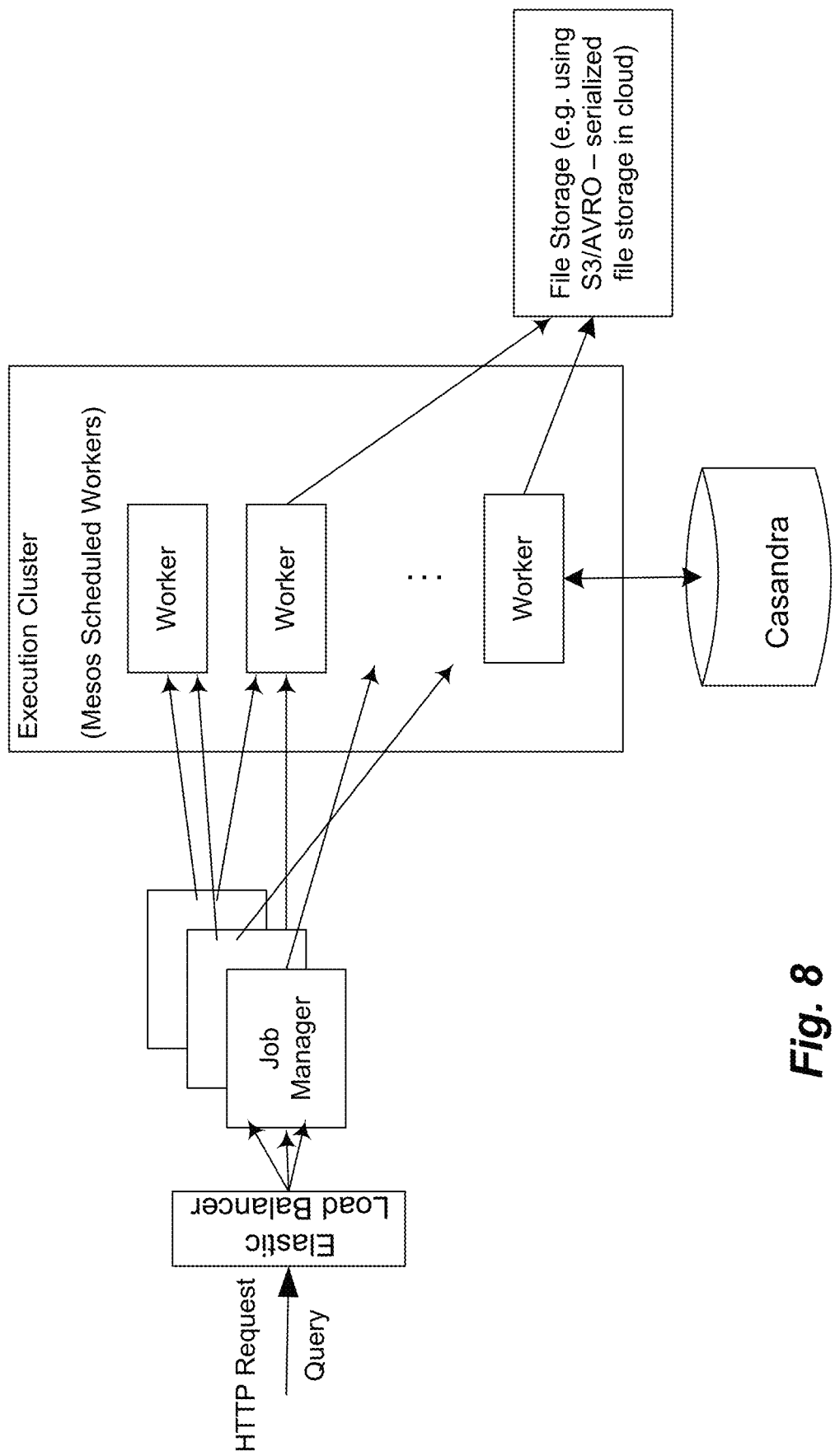
FIG. 8 is an example schematic illustrating the MQL execution environment.

FIG. 8 illustrates the MQL execution environment for executing MQL queries.

The execution cluster is a set of resources manager by Apache Mesos. Metriv uses Apache Spark as an integral part of the execution engine, which allows it to distribute subqueries to Mesos-scheduled worker processes for parallel execution. S3/AVRO is used as a serialization format; however, other serialization formats may be incorporated.

The workers are partition aware, that is they know which Cassandra node holds the data in which they are interested, and send the request for data directly to the Cassandra node that can most efficiently provide it.

Because Cassandra is a NoSQL database, data is often denormalized to provide for multiple efficient query paths. The MQL Service provides a consistent logical model of the data while selecting the most efficient query path under the covers. Because of this and the worker process partition awareness, many common queries retrieve data directly from the Cassandra cluster node—holding it with the same efficiency and latency one might expect from a traditional SQL indexed query.

Figure 9:
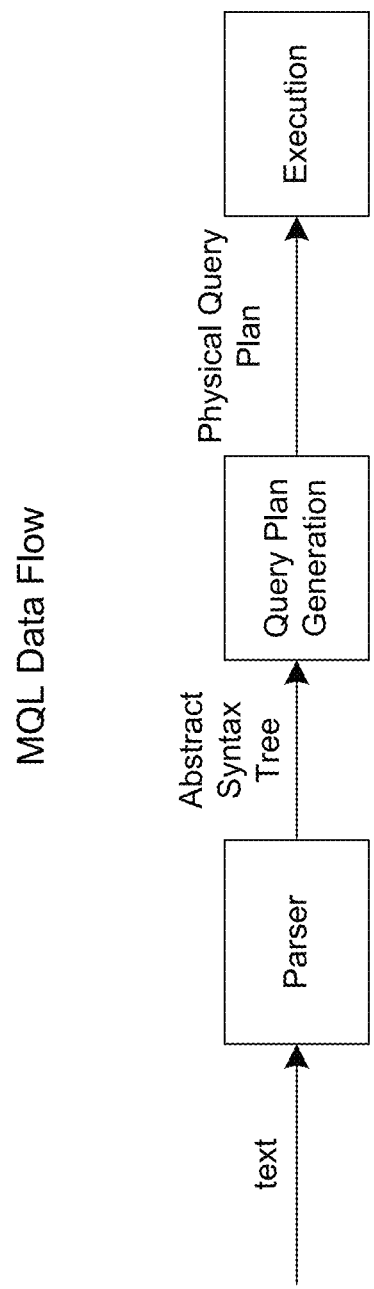
FIG. 9 is a block diagram showing how MQL converts a query into an executable plan.

The diagram in FIG. 9 shows the series of steps that the MQL Service takes in order to convert a query into an executable plan.

Once the MQL query is converted into an operator graph, the predicates involved in the query are pushed down the tree to the data source graph node. Each data source graph node knows what access patterns are available and can, based on the predicates, select the most efficient access pattern.

Figure 10:
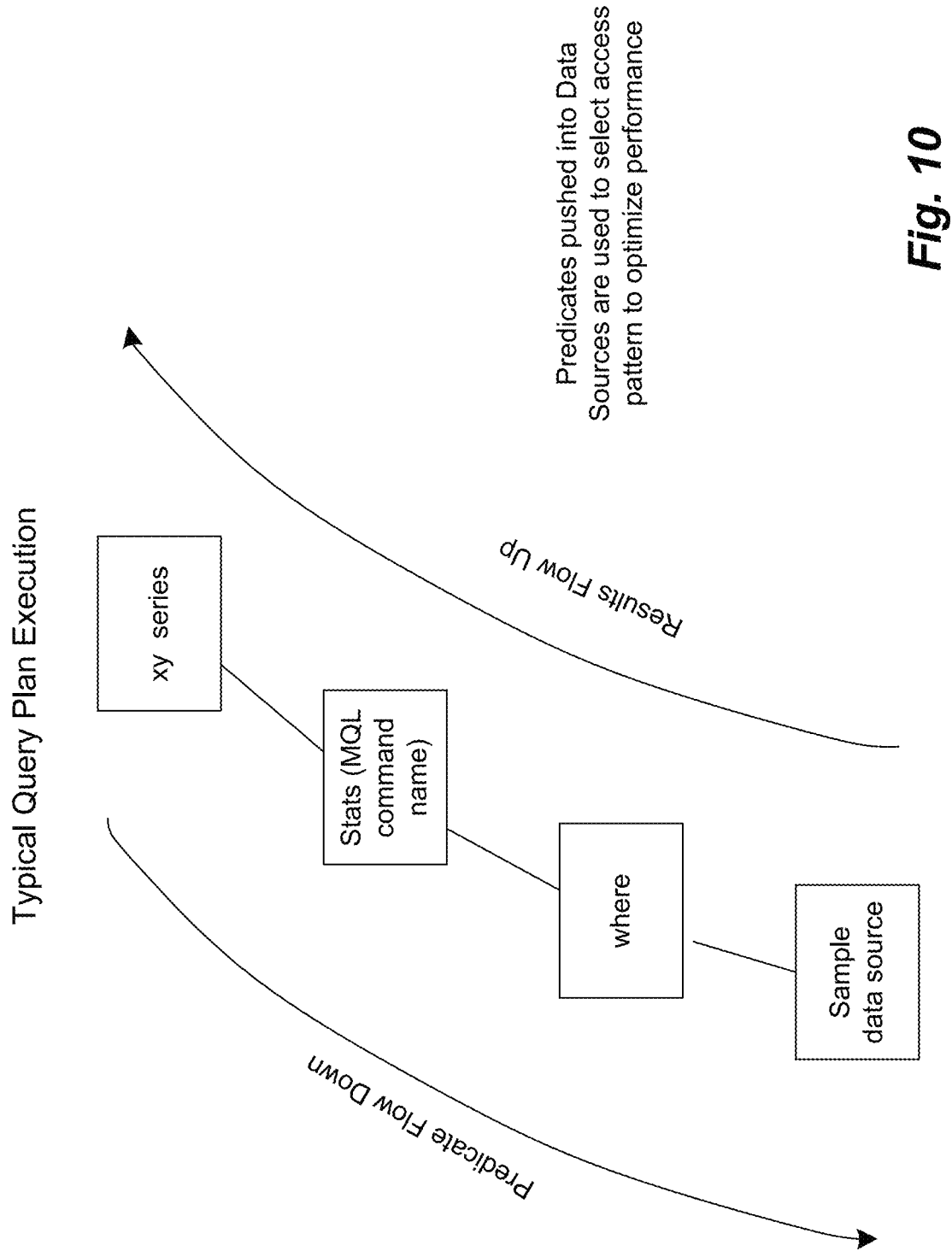
FIG. 10 is a block diagram illustrating the execution process of an MQL query.
Figure 11:
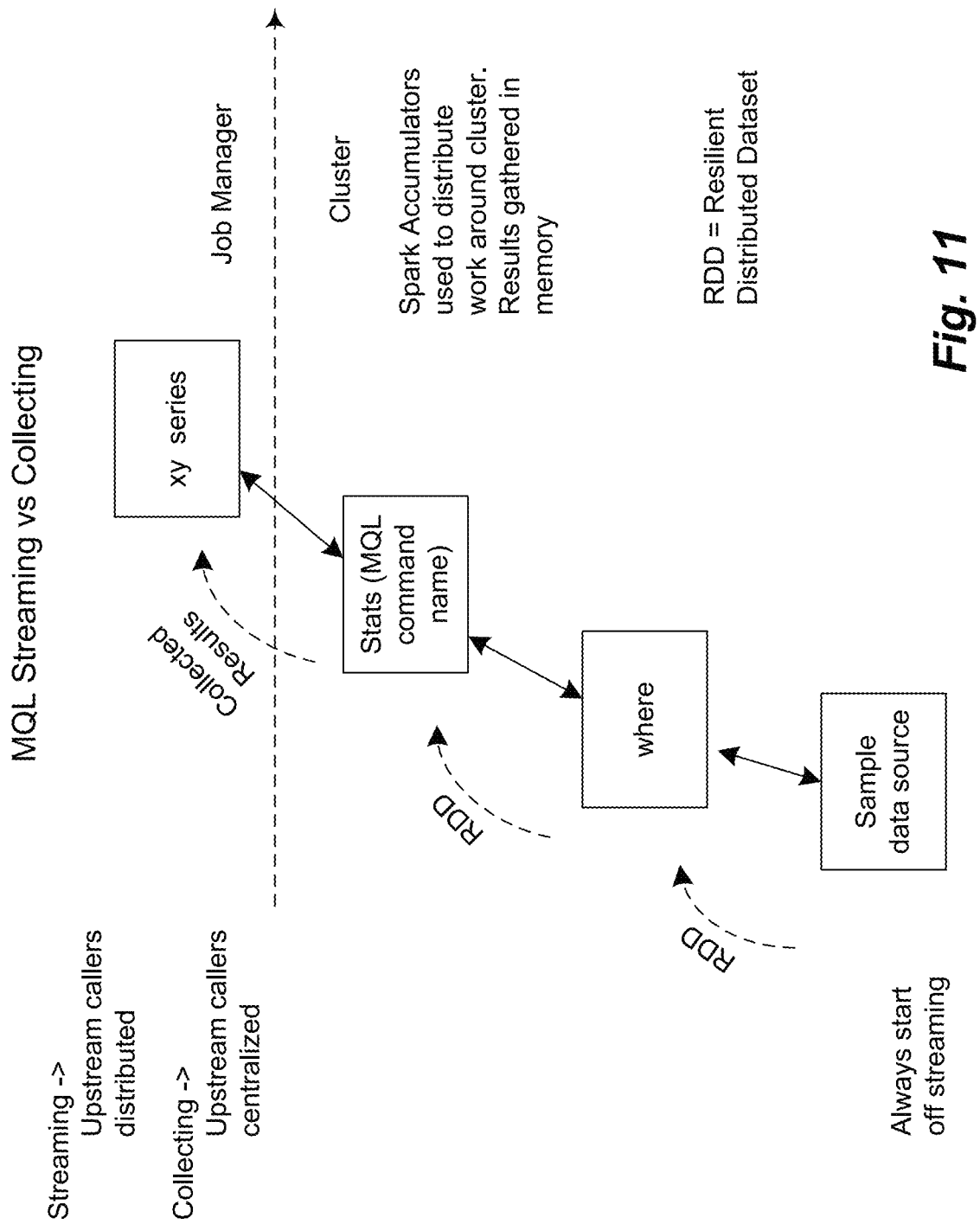
FIG. 11 is a block diagram illustrating different types of workload management for MQL execution.

Once the predicates are pushed down, the top level node can be asked to iterate its results in a stream. The diagram in FIG. 10 shows the execution process:

One important point is that most operations can be distributed around a set of workers; however, some operations cannot. The execution engine keeps track of each graph node's ability to stream starting from the data source. The execution engine has a bias for remaining in the mode that it's currently in. Since data sources are always streaming, this means that the entire execution tree has a bias towards streaming, but it can be "switched over" by a node that indicates that all its upstream callers should be executed in what is called "collecting" mode. In collecting mode the upstream callers are centralized. In general, collecting occurs in the "job manager" (see FIG. 8) as opposed to by the workers, which implement streaming. FIG. 11 illustrates how commands are executed as tasks in either streaming mode or collecting mode.

The "stats" command is a good example of a node that does its work using streaming mode but ends up collecting its results. Stats uses Apache Spark accumulators to distribute the work of collecting statistics across the pool of workers, but the final accumulator values are collected into the Mojo job manager. From that point on, the execution engine has a bias towards working in local memory, although it can be forced to work in the distributed environment, again using the "distribute" command.

Machine Learning and Metriv

This section describes Metriv use of machine learning as well as future directions.

Current Uses

Metriv currently uses machine learning (ML) techniques in three areas, recommendations, workload classification, and communications analysis.

Instance Type Recommendations

Recommending instance types is, in machine learning terms, a classification problem. You have an unknown instance (the machine for which you want a recommendation) and training data, which is a collection of instances which are labeled with their AWS (or GPC, Azure, . . . ) instance type. This is the classical setup of a supervised classification algorithm.

There are a number of classification algorithms available to use with Metriv. Since a premium is placed on being able to provide the user with an explanation of why a certain recommendation is made, Metriv prefers to stay away from "black-box" algorithms. Therefore, the recommendations system is based on a kNN (k nearest neighbor) technique. KNN requires that each instance be encoded as a vector and training data labelled with the appropriate class. Metriv encodes successful migrations as a vector of various attributes including:

CPU (in MHz)
Memory (in MB)
Ephemeral Storage Requirements (in GB)
Required Ephemeral IOPS
Required EBS (or equivalent) IOPS
Required network throughput.

Then an instance for which a recommendation is needed is converted into the same vector space, based on the method required. In other words, is it desirable to provision as previously configured, by the 95% utilization level, or at the average utilization? The nearest k successful migrations are collected and the instance type that represents the largest proportion of the k successful migrations is chosen as the final recommendation, with some restrictions.

Because of the granularity of control afforded by EBS (storage) through differing storage types, and provisioned IOPS volumes, recommending a storage configuration is much more straightforward and requires no machine learning techniques.

There are a number of small complications and one large one. First the successful migration vectors must be filtered to eliminate possibilities that would be under-provisioned based on a hard-constraint. For instance, Metriv will not recommend an instance type that under-provisions either ephemeral disk or memory. Instead, it might allow slight under-provisioning of CPU, IOPS, or Network throughput. Metriv will also not provision ephemeral disk space in place of on-premises persistent storage. In addition, the system may scale the successful migration data to allow for "headroom" in the recommendation.

The large complication is that simply using raw CPU, Memory, disk, and network traffic does not take into account how one might want to trade-off one requirement vs. another. The relative scale of these elements can have a dramatic effect on recommendations. To account the possibility of trade-offs, Metriv must scale the individual elements of the feature vectors according to how they should be weighted in the trade-offs. The system does this by converting the feature vector into currency (dollars). To look at it from a certain perspective, if one says that he would want to spend X dollars on IOPS (or CPU, etc.) if possible, then what is the closest instance type? The conversion from an individual feature to currency is standardized across providers using a multiple regression analysis of pricing data.

Instance Recommendation Futures

Currently training instance data are sparse and synthesized from published information. This has advantages from a computation perspective and few downsides. Eventually, Metriv would choose to take a sample of successful migrations as training data. The eventual goal would be to display to the using information that says, "Of 213 successful migrations of similar workloads, 80% were onto m3.2xlarge instances." The explanatory power of such a statement would be very desirable.

In some instances, Metriv track migrations automatically, using some infrastructure in place to track this data.

Workload Classification

The topic of workload classification is difficult if you are unwilling to settle for a simple rule-based system because the number of potential indicators you could use to make a determination of workload is very large. In Metriv, users are allowed to tag servers as performing a certain workload. Metriv then uses that as training data (across all customers) and using machine learning techniques to classify each system according to its actual usage.

First, workload on a machine is converted to a large vector. This vector is tending to be about 60K elements in length. In this vector are elements which represent what ports the system is communicating on (one element per port), what processes are running, CPU utilization by process, read IO per process, and write IO per process. With such a large set of possible measures on which to base decisions on, Metriv must be careful to choose an algorithm that will provide good results and not require excessive computations resources. Classification trees are a current favored approach although other approaches may yield similar results.

Classification trees work by trying to find a simple condition like, "SQL Server is running" that can be used to explain the labels on the training data. Then, within both the true and false branches of that condition, the algorithm continues the same process, recursively, until it reaches a maximum depth. Then paths which don't significantly improve the total performance of the classification tree are pruned out. The end result looks something like:

```
If (feature running:bzip2 (30291) <= -0.031901041666666664)
  If (feature port:5051 (25690) <= -0.004014615767776769)
    If (feature port:10080 (80) <= 0.06545305860040496)
      If (feature port:3268 (24371) <= 9.218645599886592)
        If (feature port:10123 (123) <= -0.022074842409859904)
          If (feature running:cbengine (30295) <= -1.0)
            If (feature port:1688 (7395) <= -0.015331052639731254)
              Predict: _NONE (31.0 (prob = 1.0))
            Else (feature port:1688 (7395) > -0.015331052639731254)
              If (feature port:135 (3769) <= -0.0020500225574119103)
                Predict: _NONE (31.0 (prob = 1.0))
              Else (feature port:135 (3769) > -0.0020500225574119103)
                Predict: Teds (25.0 (prob = 1.0))
          Else (feature running:cbengine (30295) > -1.0)
            Predict: Windows Domain Controller (29.0 (prob = 1.0))
        Else (feature port:10123 (123) > -0.022074842409859904)
          Predict: Microsoft SCCM Site Server (16.0 (prob = 1.0))
      Else (feature port:3268 (24371) > 9.218645599886592)
        If (feature port:139 (4198) <= -0.05097777503734046)
          Predict: _NONE (31.0 (prob = 1.0))
  ... ETC
```

Other Considerations

Currently the operating system is not part of the feature vector, therefore the classification tree algorithm sometimes latches onto the existence of a running process as a proxy for OS type (for instance "kworker"). This does not affect accuracy but explanations derived from decisions trees would read much more nicely if there referred to the OS type instead of a random but ubiquitous running process.

The Metriv system currently use the classification tree to detect a single workload class. In cases where multiple workloads are performed by a single system, future classifiers will use logistic regression against a feature vector that includes performance attributes of processes using resources on each system.

Network Topology Analysis

The Network topology support in scenarios uses graph-theoretic algorithms to help tame the chaos as it's easy for a graph of all connected systems to quickly expand to cover the entire network. While these algorithms don't traditionally fall under the category of machine learning, they certainly appear that way to an end-user.

Currently, a user can select a set of nodes to be included in a scenario. A scenario represents a set of system what the user would like to migrate. A key concern is whether the user is forgetting other systems on which the currently included systems are dependent. To help highlight these systems, the Metriv system displays all the dependencies on which the included systems depend both directly and indirectly. To do this the system represents the communications between all nodes on the network as an undirected graph. Then it uses a distributed graph clique algorithm to pick out inter-communicating subsets. Finally, the system presents to the user only those subsets which include at least one member of the scenario.

The result can be very large due to the presence of systems that we call "keystone" systems. These might be DNS server or other highly-utilized service. Since the inclusion of these systems in a scenario can result in the inclusion (by transitivity) of all the systems in the network, we allow the user to mark systems and keystone systems. This has the effect of removing that node from the graph clique calculation.

Other Considerations

N-tiered application detection. A extension of the current graph-theoretic algorithms can be used to find n-tiered applications. The steps are as follows:

1. Build the communication graph using only systems and their links where the service type or communication type might be part of an applications cluster. For instance, for a traditional n-tiered application, the algorithm might include all database servers, all http servers and all node that communicate with http servers.
2. Run the graph cliques algorithm on the resulting graph.
3. Return just the cliques that have all the conditions specified in the first step (i.e. the clique must contain at least one database server, at least one http server, and at least one node communicating with one of the http servers).
4. Each clique then represents a separate n-tiered application.

In addition, Metriv has the ability to filter out communications links that are sporadic. There's also a capability which collapses multiple systems into a single system for the purposes of graph calculations. The ability to collapse multiple systems into a single system is also possible.

The following natural progressions are planned to using currently-held data to provide additional capabilities Future Applications of ML Techniques in Metriv
Periodicity detection will recognize periodic workloads where auto scaling groups should be used to reduce costs and enhance scalability at load.
Per-machine outlier detection based on PCA or autoencoders may be used to find systems which suddenly change behavior.
Per-workload class outlier detects when a node classified as a SQL Server stops behaving like a healthy SQL Server.
Predicting out-of-resource conditions with time-series modelling to detect possible out-of-resource issues in advance of the problem manifesting itself.
Automatic detection and labelling of Keystone service nodes, such as file servers, DNS servers, authentication services. Automatic discovery of services such as these can also enhance n-tier service discovery by providing cut points for topology graphs.
Other Enhancements
Application/Service Mapping
By mapping command lines into higher-level apps, it is possible to both give friendly names to long command lines and to also map similar command lines to a single, common service. Metriv has planned a UI-based naming process initially, but expects to use supervised learning techniques once sufficient training data is available to automatically map various command lines to services.

The mapping of multiple command lines into higher-level name app or service allows reduction of the number of features used in workload classification and increases similarities among nodes where small differences in the command line might otherwise cause ML algorithms to consider them completely separate applications.

Inside-the-Firewall Proxy
Since enterprise IT systems often do not have direct access to the Internet, native Metriv agents running on them must instead connect to a Mojo service that proxies communications between them and the Metriv cloud service.

Extend Native Sensor to Collect Per-Process Network Activity
Per-process network activity is to be captured and correlated with TCP sessions in order to understand which processes are communicating among nodes and with how much traffic volume. This information will be used to enhance topology analysis and the Scenarios UI to include process and traffic detail.

Component-Aware Plugins
Service multiplexing components such as web servers (NGINX, Apache, IIS) and databases (SQL, MySQL, PostgreSQL) can have configuration and versions interrogated via their APIs or by reading configuration data from the filesystem. When systems are discovered via running processes, a policy will direct the Native Sensor to find and deliver configuration information to Metriv. We envision systems to partially or fully automate migration or of such apps to cloud services or into container services such as Docker, along with identifying possible risks associated with running obsolete or insecure software versions.

Automated N Tier Service Discovery
Using the N Tier Service discovery approaches described in the Machine Learning section, Metriv will automatically identify and name migration Scenarios.

Docker Plugin for Metriv Sensor Hub
Docker discovery and performance APIs fit well into the current Metriv Sensor Hub plugin model and will be a powerful and straightforward extension of Metriv capabilities into containerized services.

Example Computing System Environment
Example embodiments described herein provide applications, tools, data structures and other support to implement a data management and analytics platform to be used for analyzing and optimizing IT infrastructure using modernization techniques such as cloud deployment and virtualization. Other embodiments of the described techniques may be used for other purposes. In this description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 12:
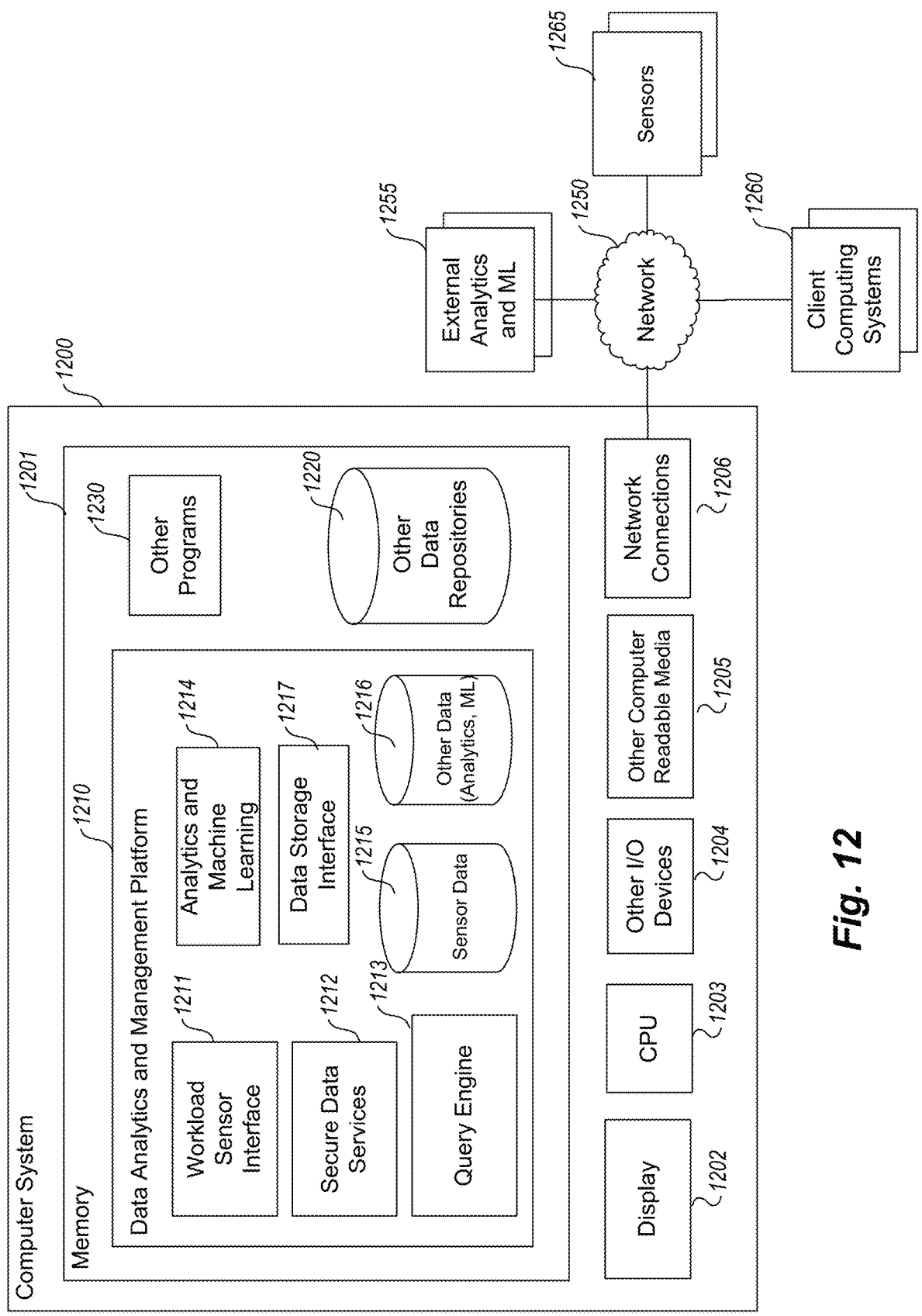
FIG. 12 is an example block diagram of a computing system for practicing embodiments of a Data Analytics and Management Platform.

FIG. 12 is an example block diagram of an example computing system that may be used to practice embodiments of a DMAP described herein. Note that one or more general purpose virtual or physical computing systems suitably instructed or a special purpose computing system may be used to implement an DMAP. Further, the DMAP may be implemented in software, hardware, firmware, or in some combination to achieve the capabilities described herein. The DMAP 1210 shown is an example computer system that may be used to provide the web services shown in Figure A above. This (server side) computing system 1200 may be connected via one or more networks, e.g. network 1250, to one or more sensors 1265 or client computing systems 1260.

The computing system 1200 may comprise one or more server and/or client computing systems and may span distributed locations. In addition, each block shown may represent one or more such blocks as appropriate to a specific embodiment or may be combined with other blocks. Moreover, the various blocks of the DMAP 1210 may physically reside on one or more machines, which use standard (e.g., TCP/IP) or proprietary interprocess communication mechanisms to communicate with each other.

In the embodiment shown, computer system 1200 comprises a computer memory ("memory") 1201, a display 1202, one or more Central Processing Units ("CPU") 1203, Input/Output devices 1204 (e.g., keyboard, mouse, CRT or LCD display, etc.), other computer-readable media 1205, and one or more network connections 1206. The DMAP 1210 is shown residing in memory 1201. In other embodiments, some portion of the contents, some of, or all of the components of the DMAP 1210 may be stored on and/or transmitted over the other computer-readable media 1205. The components of the DMAP 1210 preferably execute on one or more CPUs 1203 and manage the acquisition and analysis of time series workload data as described herein. Other code or programs 1230 and potentially other data repositories, such as data repository 1220, also reside in the memory 1201, and preferably execute on one or more CPUs 1203. Of note, one or more of the components in FIG. 12 may not be present in any specific implementation. For example, some embodiments embedded in other software may not provide means for user input or display.

In a typical embodiment, the DMAP 1210 includes one or more workload sensor interfaces 1211, one or more secure data services 1212, one or more query engines, one or more analytic and/or machine learning engines 1214, and one or more data storage interfaces. In at least some embodiments, the one or more data storage interfaces 1217 is provided external to the DMAP and is available, potentially, over one or more networks 1250. Other and/or different modules may be implemented. In addition, the DMAP may interact via a network 1250 with external analytics or machine learning code 1255 that uses results computed by the DMAP 1210 to generate recommendations, one or more client computing systems 1260, and/or one or more client system sensor devices 1265. Also, of note, the data repositories 1215 and 1216 may be provided external to the DMAP as well, for example in a knowledge base accessible over one or more networks 1250.

In an example embodiment, components/modules of the DMAP 1210 are implemented using standard programming techniques. For example, the DMAP 1210 may be implemented as a "native" executable running on the CPU 1203, along with one or more static or dynamic libraries. In other embodiments, the DMAP 1210 may be implemented as instructions processed by a virtual machine. A range of programming languages known in the art may be employed for implementing such example embodiments, including representative implementations of various programming language paradigms, including but not limited to, object-oriented, functional, procedural, scripting, and declarative.

The embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the DMAP 1210 (e.g., in the data repositories 1216 and 1217) can be available by standard mechanisms such as through C, C++, C#, and Java APIs; libraries for accessing files, databases, or other data repositories; through scripting languages such as XML; or through Web servers, FTP servers, or other types of servers providing access to stored data. The data repositories 1215 and 1216 may be implemented as one or more database systems, file systems, or any other technique for storing such information, or any combination of the above, including implementations using distributed computing techniques.

Also the example DMAP 1210 may be implemented in a distributed environment comprising multiple, even heterogeneous, computer systems and networks. Different configurations and locations of programs and data are contemplated for use with techniques of described herein. In addition, the server and/or client may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an DMAP.

Furthermore, in some embodiments, some or all of the components of the DMAP 1210 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Example Data Analytics Processes

Figure 13:
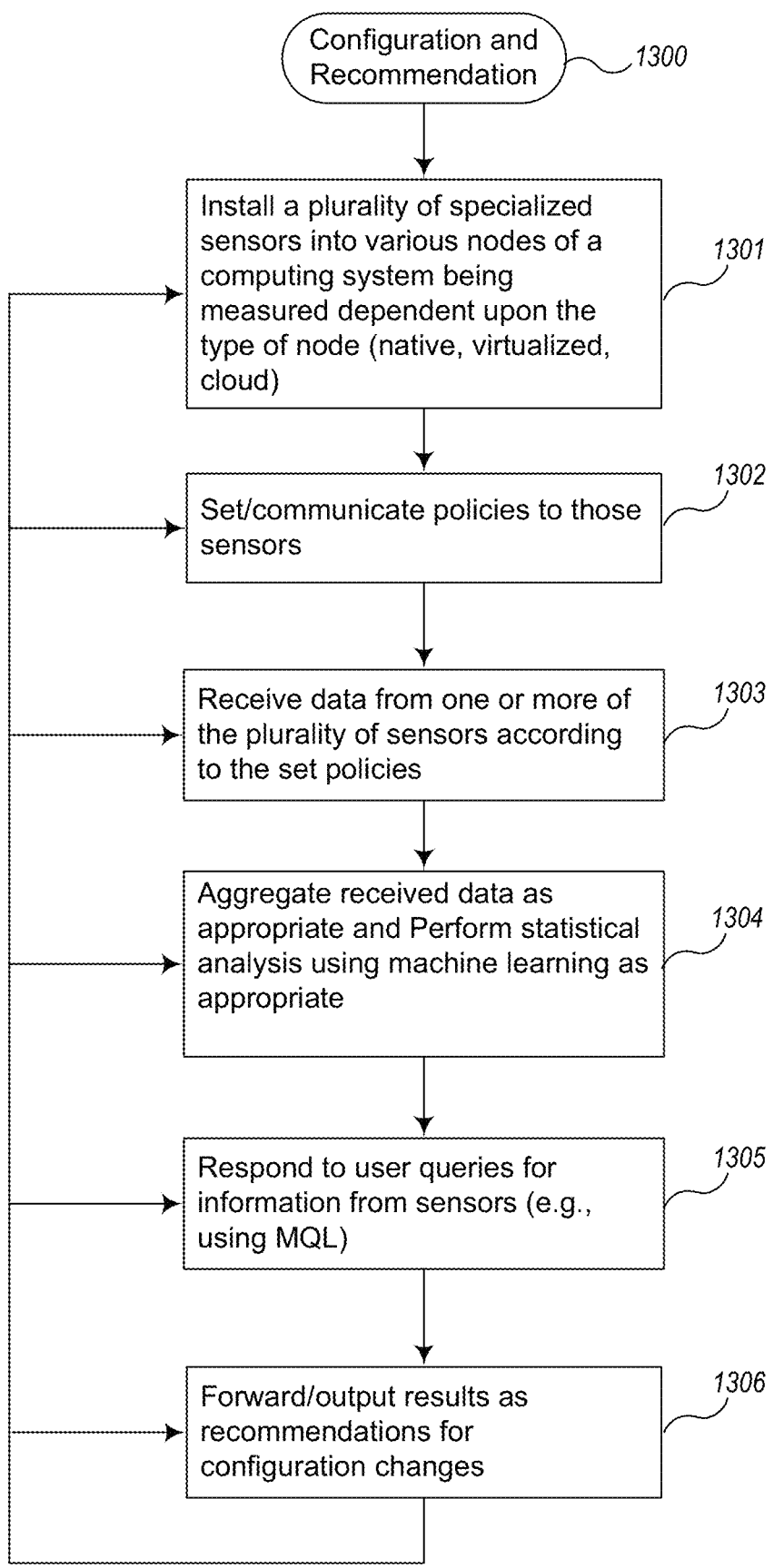
FIG. 13 is an example flow diagram of logic for interoperating with specialized sensors to obtain configuration and system information.

FIG. 13 is an example flow diagram of logic for interoperating with specialized sensors to obtain configuration and system information. In an example DMAP, the services shown in FIGS. 1A and 12 perform logic 200 to obtain information regarding configurations in which sensors are installed and to set policies for these sensors regarding, for example, what is being measured and frequencies for doing so.

More specifically, in block 1301, the DMAP installs a plurality of sensors into the various nodes of the configuration being monitored. For examples, these sensors may be of the native type, a pluggable sensor into, for example, a virtualized environment that uses Application Programming Interfaces (API) of the virtual environment to obtain data, or a cloud sensor that uses cloud API to measure aspects of the node.

In some example DMAPs, the native sensors that are installed into the operating system of a node "move" with the node so that information from the node's operating system can be obtained from these sensors even when the node has been migrated to a virtualized environment or the cloud. In these latter cases, the data from the native sensors are combined (e.g., aggregated) with data from other sensors later installed on the node (e.g., cloud or virtual pluggable sensors) to continue to obtain even more accurate and abundant information.

In block 1302, the DMAP is able to set or communicate policies to the plurality of sensors. For example, in the Metriv example described above, these policies can be communicated via the Metriv Secure Data Services web service.

In block 1303, the DMAP receives data from one or more of the plurality of sensors according to the set policies.

In block 1304, the DMAP aggregates the data received from the various sensors and performs statistical analysis on the data. This statistical analysis is used to determine whether to recommend any changes to the configuration of one or more nodes and what steps the user should take to migrate. In some instances, the statistical techniques include cosine similarity or k-means clustering algorithms. In some instances the analysis involves using predictive analytics such as those available through standard machine learning techniques (e.g., Bayesian algorithms, clustering, etc.). In some instances, the analysis takes into account data obtained from humans using other systems, such as through answers to questionnaires to train the machine learning algorithms. In this case, aspects of "socialized" data may be obtained from live human experience of similar migrations, etc.

For example, in some example DMAPs, determining which nodes are most appropriate to consider for migration to virtualized environments or to the cloud uses data collected by other sensors during successful migrations to populate feature vectors that are used by k-nearest neighbors or Support Vector Machines (SVM) algorithms to find similar systems or interdependent sets of nodes to predict behavior of similar migrations. These feature vectors or SVM algorithms are then used to determine whether a node being considered for migration is likely to be a successful migration or not.

Also, although not shown, in some instances it is desirable to consider the interdependencies when determining migration recommendations. For example, analysis of the interdependencies indicated by network traffic and other data such as VMware topology of virtual or physical computers can be used to determine which subset of an interacting set of computers to move as a single project. The DMAP can accomplish this by using graph analysis algorithms to determine groups of isolated computers. Additionally, the DMAP can generate all the possible ways to break dependencies among these isolated groups of computer nodes (or computer systems) and then use a filtering step to remove non-viable solutions followed by a scoring step to select the top-n solutions. The filtering step can be accomplished by heuristics but may be more effectively accomplished using Support Vector Machines (SVM) or other machine learning solutions. The scoring step can likewise be accomplished by heuristics but is can also be implemented using a Weighted Least Squares (WLS) algorithm. Other algorithms and machine learning techniques may be similarly incorporated.

In addition, although not shown, a similar analysis and techniques can be used to determine a recommended set of steps to update and move the determined nodes to virtualized operating environments by using sensor data and user interactions with the website to track successful migration steps and apply the same recommended steps to new migrations.

In addition, although not shown, a similar analysis and techniques can be used to calculate and communicate a projection of costs for moving the determined nodes to the virtualized operating environments by using k-nearest neighbors to discover similar performance and workload profiles available from commercial cloud providers and/or virtualization environment providers.

In block 1305, the DMAP responds to user queries or system queries specified, for example, using the MQL language, and provides visualizations using a web service (e.g., Mojo services in FIG. 1A/1B, Secure Data Services 1212 in FIG. 12).

In block 1306, the DMAP forwards (e.g., outputs, communicates, sends, etc.) results of the analytics typically as recommendations for configuration adjustments where desirable, including, for example, the recommended steps and a projection of costs.

As indicated earlier, some of these logically blocks may or may not be present in any particular implementation. In addition, one or more of these blocks of logic may be performed in different orders. Also, additional blocks of logic may be integrated into the flow shown in FIG. 13.

In some instances, the analysis described with reference to FIG. 13 is aided by categorizing the nodes in a computing system. For example, the nodes may be categorized according to the type of work performed by the node. Then, when a computing node appears to depart from the type of work performed according to the assigned category, a user may be alerted using anomaly detection and outlier detection algorithms on the data collected by the sensors. In some instances of an example DMAP, the categories reflect one or more of a SQL Server, a database server, a web server, an end-user computer, a containerization server, a virtualization server, an application server, a cloud-based service, a microservices server, an LDAP server, a DNS server, a file server, or another server or containerized service that has a role in a system with interdependent services on multiple nodes.

CONCLUSION

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 62/198,052, entitled "DATA ANALYTICS AND MANAGEMENT," filed Jul. 28, 2015, which is incorporated herein by reference in its entirety.

From the foregoing it will be appreciated that, although specific embodiments have been described herein for purposes of illustration, various modifications may be made without deviating from the spirit and scope of the invention. For example, the methods and systems for performing data analytics and management discussed herein are applicable to other architectures other than a cloud and virtualization architecture. Also, the methods and systems discussed herein are applicable to differing protocols, communication media (optical, wireless, cable, etc.) and devices (such as wireless handsets, electronic organizers, personal digital assistants,

The invention claimed is:

1. A method for automatically analyzing performance of a computing environment, comprising:
providing a plurality of sensors to be installed for the computing environment, wherein the computing environment has a plurality of computing nodes, wherein the plurality of sensors includes different types of hardware or software sensors, including:
(a) a native sensor configured to operate on a computing node of the computing environment and receive data directly from an operating system of the computing node,
(b) a multiplexing sensor configured to operate in a pluggable service behind a firewall of the computing environment and to discover and collect configuration information from multiple computing nodes in the computing environment using one or more Application Programming Interfaces (APIs) accessible behind the firewall, and
(c) a cloud sensor configured to operate in a cloud-based service outside the firewall and collect performance information from one or more APIs available from the cloud-based service; and
performing, at the cloud-based service:
sending one or more data collection policies to one or more of the plurality of installed sensors, wherein the one or more data collection policies specify one or more respective attributes of data to be collected by the one or more installed sensors;
receiving data from the plurality of installed sensors, including the one or more respective attributes collected by the one or more installed sensors according to the one or more data collection policies;
automatically aggregating the received data and performing statistical analytics on the aggregated data regarding one or more of resource requirements, interdependencies, and efficacy of the computing nodes of the computing environment;
providing the results of the statistical analytics as one or more recommendations for configuration changes to the computing environment;
automatically determining, based at least in part on the aggregated data and the results of the statistical analytics, an attribute vector of the computing node;
automatically providing the attribute vector as input to a machine-learned system to determine an instance type of a cloud technology to which to migrate the computing node, wherein the machine-learned system is trained using a machine-learning technique and based on instance types used for successful migrations of computing nodes; and
providing another recommendation indicating the instance type to which to migrate the computing node.

2. The method of claim 1 wherein the forwarding the results of the statistical analytics as recommendations further comprises:
performing, at the cloud-based service:
automatically determining which nodes or interdependent sets of nodes are most appropriate to consider for migration to cloud technologies;
automatically determining a recommended set of steps to update and move the determined nodes to the cloud;
automatically calculating a projection of costs for moving the determined nodes to the cloud; and
outputting an indication of the determined nodes to consider for migration, the recommended steps, and the calculated projection of costs.

3. The method of claim 2 wherein the automatically determining which nodes are most appropriate to consider for migration to cloud technologies incorporates input from user solicited data from metadata or questionnaires regarding types of workloads and environments that users considered appropriate to migrate.

4. The method of claim 1 wherein the forwarding the results of the statistical analytics as recommendations further comprises:
performing, at the cloud-based service:
automatically determining which nodes or interdependent sets of nodes are most appropriate to consider for migration to virtualized operating environments;
automatically determining a recommended set of steps to update and move the determined nodes to virtualized operating environments;
automatically calculating a projection of costs for moving the determined nodes to the virtualized operating environments; and
outputting an indication of the determined nodes to consider for migration, the recommended steps, and the calculated projection of costs.

5. The method of claim 4 wherein the automatically determining which nodes are most appropriate to consider for migration to virtualized operating environments incorporates input from user solicited data from metadata or questionnaires regarding types of workloads and environments that users considered appropriate to migrate.

6. The method of claim 1 wherein the machine-learned system is trained via a supervised learning technique and using training data that indicates workloads of other computing nodes that have been migrated to different instance types of one or more cloud technologies.

7. The method of claim 1 wherein the performing statistical analytics further comprises:
using statistical techniques, determining whether a user might become interested in configuration of a particular node; and
when it is determined that the user might become interested in configuration of the particular node, adjusts a data collection interval and report-to-server interval to provide appropriate balance between measurement frequency and data volume for the particular node.

8. The method of claim 1, further comprising:
assigning a category to each of the computing nodes according to a type of work performed at the computing node; and
alerting an end user to anomalies by alerting the user when a computing node appears to depart from the type of work performed according to the category assigned to that computing node.

9. The method of claim 8, further comprising integrating anomalies into the forwarding the results of the statistical analytics as recommendations for configuration changes.

10. The method of claim 8 wherein the categories reflect at least one of a SQL Server, a database server, a web server, an end-user computer, a containerization server, a virtualization server, an application server, a cloud-based service, a microservices server, an LDAP server, a DNS server, a file server, or another server or containerized service having a role in a system with interdependent services on multiple nodes.

11. One or more non-transitory computer-readable storage media comprising instructions that when executed on or across one or more processors of a cloud-based service cause the cloud-based service to:
send one or more data collection policies to one or more of a plurality of sensors installed for a computing environment, wherein the computing environment has a plurality of computing nodes, wherein the one or more data collection policies specify one or more respective attributes of data to be collected by the one or more installed sensors, and the plurality of sensors includes different types of hardware or software sensors, including:
  (a) a native sensor configured to operate on a computing node of the computing environment and receive data directly from an operating system of the computing node,
  (b) a multiplexing sensor configured to operate in a pluggable service behind a firewall of the computing environment and to discover and collect configuration information from multiple computing nodes in the computing environment using one or more Application Programming Interfaces (APIs) accessible behind the firewall, and
  (c) a cloud sensor configured to operate in a cloud-based service outside the firewall and collect performance information from one or more APIs available from the cloud-based service;
receive data from the plurality of installed sensors, including the one or more respective attributes collected by the one or more installed sensors according to the one or more data collection policies;
automatically aggregate the received data and perform statistical analytics on the aggregated data regarding one or more of resource requirements, interdependencies, and efficacy of the computing nodes of the computing environment to determine respective attribute vectors of the computing nodes;
automatically provide an attribute vector of one of the computing nodes to a machine-learned system to determine an instance type of a cloud technology to which to migrate the computing node, wherein the machine-learned system is trained using a machine-learning technique and based on instance types used for successful migrations of computing nodes; and
forward the results of the statistical analytics as recommendations for configuration changes to the computing environment, including a recommendation to migrate the computing node to the determined instance type of the cloud technology.

12. A data management and analytics system comprising:
one or more computers that implement a cloud-based service structured to:
  provide a plurality of sensors to be installed for a computing environment, wherein the plurality of sensors includes different types of hardware or software sensors, including:
    (a) a native sensor configured to operate on a computing node of the computing environment and receive data directly from an operating system of the computing node,
    (b) a multiplexing sensor configured to operate in a pluggable service behind a firewall of the computing environment and to discover and collect configuration information from multiple computing nodes in the computing environment using one or more Application Programming Interfaces (APIs) accessible behind the firewall, and
    (c) a cloud sensor configured to operate in a cloud-based service outside the firewall and collect performance information from one or more APIs available from the cloud-based service;
  send one or more data collection policies to one or more of the plurality of installed sensors, wherein the one or more data collection policies specify one or more respective attributes of data to be collected by the one or more installed sensors;
  receive data from the plurality of installed sensors, including the one or more respective attributes collected by the one or more installed sensors according to the one or more data collection policies;
  automatically aggregate the received data and perform statistical analytics on the aggregated data regarding the efficacy of the computing nodes to determine respective attribute vectors of the computing nodes of the computing environment;
  automatically provide an attribute vector of one of the computing nodes to a machine-learned system to determine an instance type of a cloud technology to which to migrate the computing node, wherein the machine-learned system is trained using a machine-learning technique and based on instance types used for successful migrations of computing nodes; and
  forward the results of the statistical analytics as one or more recommendations for configuration changes to the computing environment, including a recommendation to migrate the computing node to the determined instance type of the cloud technology.

13. The data management and analytics system of claim 12 wherein the recommendations for configuration changes comprise a recommendation to migrate the computing node to a cloud-based environment or a recommendation to migrate a node to be a hosted environment using virtualization technologies.

14. The data management and analytics system of claim 12 wherein the recommendations for configuration changes further comprise:
a determination of which nodes or interdependent sets of nodes are most appropriate to consider for migration to cloud technologies;
a determination of a recommended set of steps to update and move the determined nodes to the cloud;
a calculation of a projection of costs for moving the determined nodes to the cloud; and
an indication of the determined nodes to consider for migration, the recommended steps, and the calculated projection of costs.

15. The data management and analytics system of claim 12 wherein the cloud-based service further comprises:
one or more data services structured to perform the receiving and sending from and to the plurality of installed sensors;
a query engine structured with a user interface that provides a query language and executes queries to determine attributes of one or more of the computing nodes based upon data received from the plurality of installed sensors;
an analytics services structure to provide statistical analytics and predictive analytics based upon data received from the plurality of installed sensors or specified by an executed query; and
data storage structured to store data received from the plurality of installed sensors.

16. The data management and analytics system of claim 12 wherein the plurality of sensors include sensors for mobile devices and cloud-hosted devices.

17. The one or more non-transitory computer-readable storage media of claim 11, wherein to provide the recommendation, the instructions when executed on the one or more processors cause the cloud-based service to:

indicate in the recommendation to migrate the computing node to a hosted environment using virtualization technologies.

18. The one or more non-transitory computer-readable storage media of claim 11, wherein to provide the recommendation, the instructions when executed on the one or more processors cause the cloud-based service to:

indicate in the recommendation a plurality of computing nodes to consider for migration, a set of recommended steps to update and move the plurality of computing nodes, and a calculation of a projection of costs for moving the plurality of computing nodes to the cloud.

19. The one or more non-transitory computer-readable storage media of claim 11, wherein the instructions when executed on the one or more processors cause the cloud-based service to:

assign a category to individual ones of the computing nodes according to a type of work performed at the computing node; and generate an alert that indicates one or more anomalies in response to a determination that one of the computing nodes departs from the type of work performed according to the category assigned to that computing node.

20. The one or more non-transitory computer-readable storage media of claim 19, wherein to provide the results of the statistical analytics, the instructions when executed on the one or more processors cause the cloud-based service to indicate in the results the one or more anomalies.

* * * * *